United States Patent
Kwon et al.

(10) Patent No.: US 9,118,420 B2
(45) Date of Patent: Aug. 25, 2015

(54) METHOD AND APPARATUS FOR OPTICAL COMMUNICATION USING A RETRO-REFLECTOR

(75) Inventors: Hyuk-Choon Kwon, Seoul (KR); Eun-Tae Won, Seoul (KR); Tae-Han Bae, Seongnam-si (KR); Jae-Seung Son, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 84 days.

(21) Appl. No.: 12/551,955

(22) Filed: Sep. 1, 2009

(65) Prior Publication Data

US 2010/0054755 A1    Mar. 4, 2010

(30) Foreign Application Priority Data

Sep. 1, 2008 (KR) .................. 10-2008-0085907

(51) Int. Cl.
| | |
|---|---|
| H04B 10/00 | (2013.01) |
| H04B 10/06 | (2011.01) |
| G02F 1/017 | (2006.01) |
| H04B 10/04 | (2011.01) |
| H04B 10/2587 | (2013.01) |
| H04B 10/114 | (2013.01) |
| H04B 10/116 | (2013.01) |

(52) U.S. Cl.
CPC .......... *H04B 10/2587* (2013.01); *H04B 10/116* (2013.01); *H04B 10/1143* (2013.01)

(58) Field of Classification Search
USPC ................................ 398/170, 140, 168–169
See application file for complete search history.

(56) References Cited

U.S. PATENT DOCUMENTS

| | | | | |
|---|---|---|---|---|
| 4,143,263 | A * | 3/1979 | Eichweber ................. | 398/170 |
| 4,635,299 | A * | 1/1987 | MacGovern ................ | 398/129 |
| 4,731,879 | A * | 3/1988 | Sepp et al. ................ | 398/170 |
| 5,459,470 | A * | 10/1995 | Wootton et al. ............ | 342/45 |
| 6,493,123 | B1 * | 12/2002 | Mansell et al. ............ | 398/169 |
| 6,944,403 | B2 * | 9/2005 | Margalit et al. ........... | 398/129 |
| 7,184,130 | B1 * | 2/2007 | Barr ........................... | 356/4.01 |
| 7,317,876 | B1 * | 1/2008 | Elliott ........................ | 398/170 |
| 7,889,997 | B2 * | 2/2011 | Won ............................ | 398/169 |
| 7,983,565 | B2 * | 7/2011 | Varshneya et al. ......... | 398/118 |
| 2002/0033981 | A1 * | 3/2002 | Keller et al. ............... | 359/170 |
| 2002/0033982 | A1 * | 3/2002 | Dewenter ................... | 359/172 |
| 2003/0053177 | A1 * | 3/2003 | Kawamura ................. | 359/174 |
| 2003/0081293 | A1 * | 5/2003 | Wood et al. ................ | 359/172 |
| 2003/0090756 | A1 * | 5/2003 | Moon et al. ................ | 359/110 |
| 2004/0091269 | A1 * | 5/2004 | Green et al. ................ | 398/130 |
| 2004/0208430 | A1 * | 10/2004 | Chin ............................. | 385/24 |
| 2005/0163511 | A1 * | 7/2005 | Cicchiello .................. | 398/170 |

(Continued)

OTHER PUBLICATIONS

Trevor K. Chan et al., "Retroreflecting Optical Modulator Using an MEMS Deformable Micromirror Array", Journal of Lightwave Technology, vol. 24, No. 1, Jan. 2006.

*Primary Examiner* — Oommen Jacob
(74) *Attorney, Agent, or Firm* — The Farrell Law Firm, P.C.

(57) ABSTRACT

An optical communication apparatus includes an optical signal transmitting unit to output an optical signal; an optical signal receiving unit to receive an optical signal; a retro-reflector to retro-reflect the received optical signal in a direction opposite to an incident angle of the received optical signal; and a control unit to direct the retro-reflector to receive the optical signal and to retro-reflect a response signal, which includes the received optical signal and data to be transmitted, in response to the received optical signal.

11 Claims, 7 Drawing Sheets

(56) References Cited

U.S. PATENT DOCUMENTS

| | | | |
|---|---|---|---|
| 2005/0286043 A1* | 12/2005 | Weinert et al. | 356/73.1 |
| 2005/0288031 A1* | 12/2005 | Davis et al. | 455/452.1 |
| 2006/0003690 A1* | 1/2006 | Onomatsu et al. | 455/3.02 |
| 2007/0058563 A1* | 3/2007 | Ishibashi et al. | 370/252 |
| 2008/0107419 A1* | 5/2008 | Won | 398/130 |
| 2008/0155261 A1* | 6/2008 | Sato et al. | 713/169 |
| 2009/0034047 A1* | 2/2009 | Dadkhah et al. | 359/245 |
| 2009/0103925 A1* | 4/2009 | Alpert | 398/130 |
| 2009/0116850 A1* | 5/2009 | Maryfield | 398/202 |
| 2010/0054755 A1* | 3/2010 | Kwon et al. | 398/170 |

* cited by examiner

US 9,118,420 B2

METHOD AND APPARATUS FOR OPTICAL COMMUNICATION USING A RETRO-REFLECTOR

PRIORITY

This application claims priority under 35 U.S.C. §119(a) to an application entitled "Method And Apparatus For Optical Communication Using A Retro-Reflector" filed in he Korean Industrial Property Office on Sep. 1, 2008 and assigned Serial No. 10-2008-0085907, the contents of which are hereby incorporated by reference.

BACKGROUND OF THE INVENTION

1. Field of the Invention

The present invention relates to optical communication such as visible light communication, and more particularly to a method and an apparatus for performing bi-directional communication by using a retro-reflector.

2. Description of the Related Art

With the improvement in light-emitting efficiency and the drop in cost of Light Emitting Diodes (LEDs), the usage of LEDs has spread not only in the market of special lighting, such as portable devices, displays, automobiles, traffic lights, billboards, etc. but also in the market of general lighting, such as fluorescent lamps, glow lamps, etc. The light emitting efficiency of white LEDs has already exceeded that of fluorescent lamps, and are now appearing on the market. Further, due to the depletion of Radio Frequency (RF) band frequencies, the possibility of entanglement between various wireless communication technologies, the increase in the requirement for the security of communication, the advent of ultra-high speed ubiquitous communication environment using $4^{th}$ Generation (4G) wireless technology, etc., attention paid to the optical wireless technology, which is complementary to the RF technology, is being and research into visible light wireless communication using a visible light LED is being conducted by various companies and organizations.

Portable mobile apparatuses, such as mobile phones or Personal Digital Assistants (PDA), and compact digital products, such as a digital camera or a Motion Picture Experts Group (MPEG) audio layer-3 (MP3) player, are equipped with an Infrared Data Association (IrDA) module based on infrared rays, and extensive research on peripheral interfaces for inter-apparatus communication has already been conducted and relevant products thereof have been developed and commercialized. Differently from RF communication, such as Bluetooth™ or Zigbee™, the infrared ray wireless communication is advantageous in that it allows for non-entanglement between apparatuses, has good security, and can be implemented with low power.

However, in the case of existing infrared ray communications, since the communication link is invisible to user's eyes, it is necessary to periodically output infrared ray signals so as to scan surrounding apparatuses. Therefore, the inevitable output of infrared ray signals, even in the case of not performing communication, causes wasteful resource consumption. Further, in the case of existing infrared ray communications, since the infrared rays are invisible to user's eyes, the infrared ray signals are widely radiated with a divergence angle of 30 degrees and the communication link is aligned through adjustment of each apparatus by users. Therefore, the wide divergence angle serves as another reason of wasteful resource consumption.

In the case of optical communications such as visible ray communication, the characteristics of light allow only single directional transmission, and bidirectional communication is possible when a transmitting unit and a receiving unit of the two apparatuses communicating with each other are aligned to each other. In aligning the communication link, the users identify the visible ray signals. At this time, when both an exact alignment of a communication direction from a first apparatus to a second apparatus and an exact alignment of a communication direction from the second apparatus to the first apparatus have been achieved, bidirectional communication is possible. However, such separate alignment of each communication link for both directions is an inconvenience to users for communication. Further, when either of the apparatuses is moved, the alignment of communication directions becomes more difficult, so as to disturb smooth signal transmission. As a result, there is a need for a method of setting a communication link, which is more efficient than the existing methods.

SUMMARY OF THE INVENTION

Accordingly, the present invention has been made to solve at least the above-mentioned problems occurring in the prior art, and the present invention provides a method and an apparatus for optical communication, by which bidirectional communication is possible only through one-directional visible ray signal transmission by using a retro-reflector.

In accordance with an aspect of the present invention, there is provided an optical communication apparatus that includes an optical signal transmitting unit to output an optical signal; an optical signal receiving unit to receive an optical signal; a retro-reflector to retro-reflect the received optical signal in a direction opposite to an incident angle of the received optical signal; and a control unit to direct the retro-reflector to receive the optical signal and to retro-reflect a response signal, which includes the received optical signal and data to be transmitted, in response to the received optical signal.

In accordance with an aspect of the present invention, there is provided a method of optical communication using a retro-reflector, that includes receiving an optical signal; and retro-reflecting, by the retro-reflector, a response signal, which includes the received optical signal and data to be transmitted, in response to the received optical signal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, various specific definitions found in the following description, such as specific elements, etc., are provided only to help in the general understanding of the present invention, and it will be apparent to those skilled in the art that the present invention can be implemented without such definitions. Further, in the following description of the present invention, a detailed description of known functions and configurations incorporated herein will be omitted when it may make the subject matter of the present invention rather unclear.

Figure 1A:
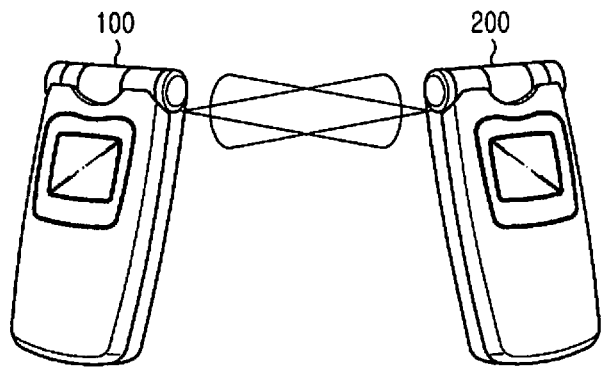
FIGS. 1A and 1B illustrate examples of communication alignment between two apparatuses performing a visible ray communication.
Figure 1B:
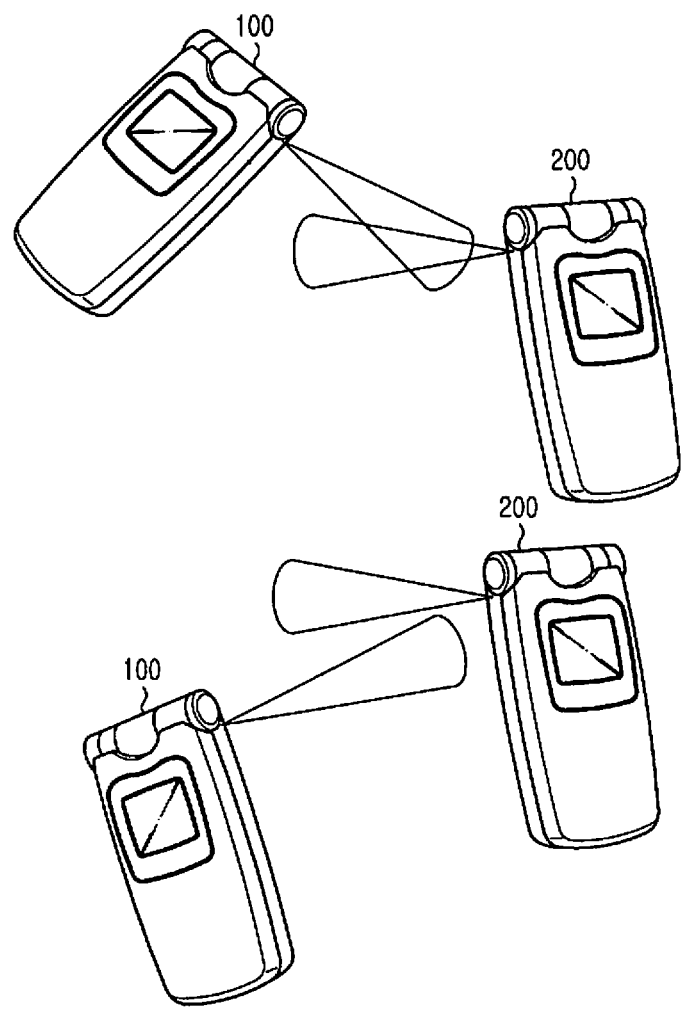

FIGS. 1A and 1B illustrate examples of communication alignment between two apparatuses performing a visible ray communication. FIG. 1A shows a state in which the communication alignment between a first apparatus 100 and a second apparatus 200 for performing a visible ray communication is in an optimum state. In this state, a communication direction of an optical signal transmitting unit of the first apparatus 100 is set toward an optical signal receiving unit of the second apparatus 200 and a communication direction of an optical signal transmitting unit of the second apparatus 200 is set toward an optical signal receiving unit of the first apparatus 100, so that the communication directions between the first apparatus 100 and the second apparatus 200 are in a directionally aligned state.

FIG. 1B shows states in which the communication alignment between the two apparatuses is not in an aligned state. In this state, since the transmitting unit of the second apparatus 200 is not oriented toward the receiving unit of the first apparatus 100, data transmission from the first apparatus 100 to the second apparatus 200 is possible while data transmission from the second apparatus 200 to the second apparatus 100 is impossible.

An optical signal receiving unit of an optical communication apparatus according to the present invention is provided with a retro-reflector. Therefore, when the communication direction has been correctly set in only one direction as shown in FIG. 1B, a communication direction setting signal is transmitted only in the set communication direction, and the apparatus having received the communication direction setting signal transmits a response signal to the transmitter-side at the same angle as that for receiving the communication direction setting signal by using a retro-reflector, so that the receiver-side can easily set the communication direction from the receiver-side to the transmitter-side. Therefore, the present invention provides an easy bi-directional communication link setting method.

Further, even in the case where the communication direction has been correctly set in only one direction, if an optical signal is transmitted in the set communication direction, an apparatus having received the transmitted optical signal retro-reflects an optical signal including data to be transmitted by using a retro-reflector. Therefore, the present invention enables a bi-directional communication even in the case where the communication direction has been correctly set in only one direction.

Figure 2:
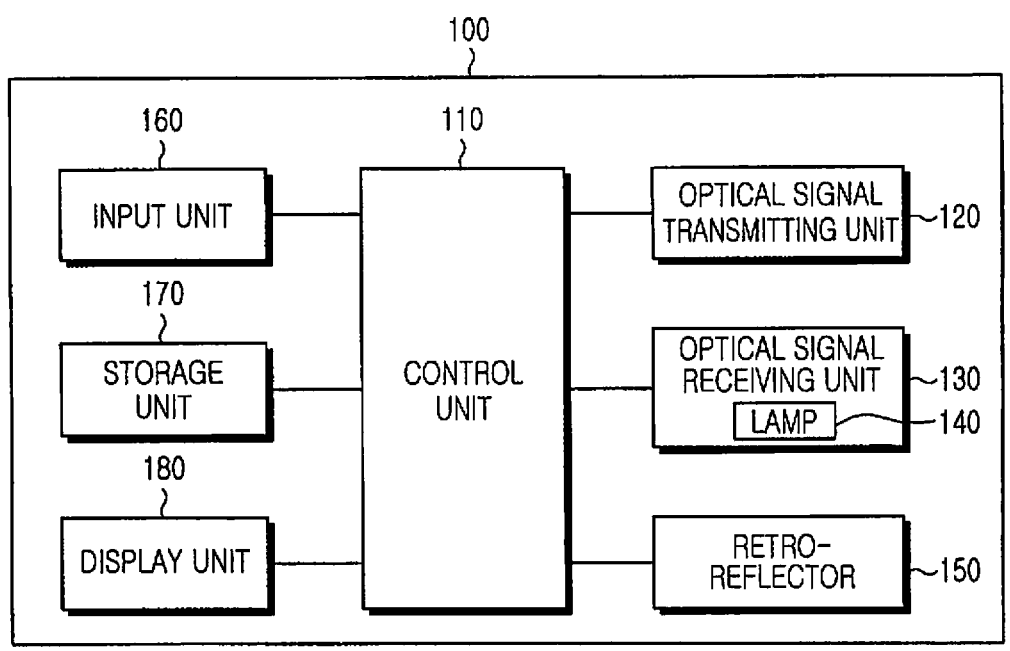
FIG. 2 is a block diagram of an optical communication apparatus according to an embodiment of the present invention.

FIG. 2 is a block diagram of an optical communication apparatus according to an embodiment of the present invention. As shown in FIG. 2, an optical communication apparatus 100 includes a control unit 110, an optical signal transmitting unit 120, an optical signal receiving unit 130, a lamp 140, a retro-reflector 150, an input unit 160, a storage unit 170, and a display unit 180.

The control unit 110 controls the general operation of the optical communication apparatus 100. The control unit 110 retro-reflects and transmits a response to a communication setting signal, which has been received through the optical signal receiving unit 130 and the retro-reflector 150 for communication direction alignment, at the same angle as that of the received signal by using the retro-reflector 150 and sets the communication direction in the retro-reflection direction.

The optical signal transmitting unit 120 may include a Light Emitting Diode (LED), a Laser Diode (LD), or a group of them, and may output modulated data in the form of a visible ray signal. The optical signal transmitting unit 120 outputs a communication setting signal for communication direction setting.

The optical signal receiving unit 130 includes a photo diode capable of receiving a visible ray signal and converting the visible ray signal to an electrical signal.

The lamp 140 displays a receiving sensitivity of the received optical signal. Further, the lamp 140 may be replaced by a reception sensitivity measurer.

The retro-reflector 150 retro-reflects an incoming optical signal at the same angle as the incident angle. In other words, since the retro-reflector 150 reflects the incoming signal along the same route as the incoming route (i.e. at the same angle as the incident angle), the retro-reflector 150 can return any visible ray signal received at any angle to the transmitter-side that has transmitted the received visible ray signal. Although the retro-reflector 150 is separate from the optical signal receiving unit 130 in FIG. 2, the present invention includes a construction in which the retro-reflector 150 and the optical signal receiving unit 130 are integrally combined.

The input unit 160 allows user input through various user interfaces, such as a keyboard, a touch pad, a touch screen, a keypad, a mouse, etc.

The storage unit 170 stores data necessary for the operation of the optical communication apparatus 100, information to be transmitted, and received data. A Random Access Memory (RAM), a Read Only Memory (ROM), and various other storage devices may be employed as the storage unit 170.

The display unit 180 displays information to be displayed to the user. When the display unit includes a touch screen, it can also perform the function of the input unit 160.

Referring to the construction of the optical communication apparatus 100 according to an embodiment of the present invention as described above, an operation of communication direction alignment according to an embodiment of the present invention will be discussed hereinafter.

Figure 3:
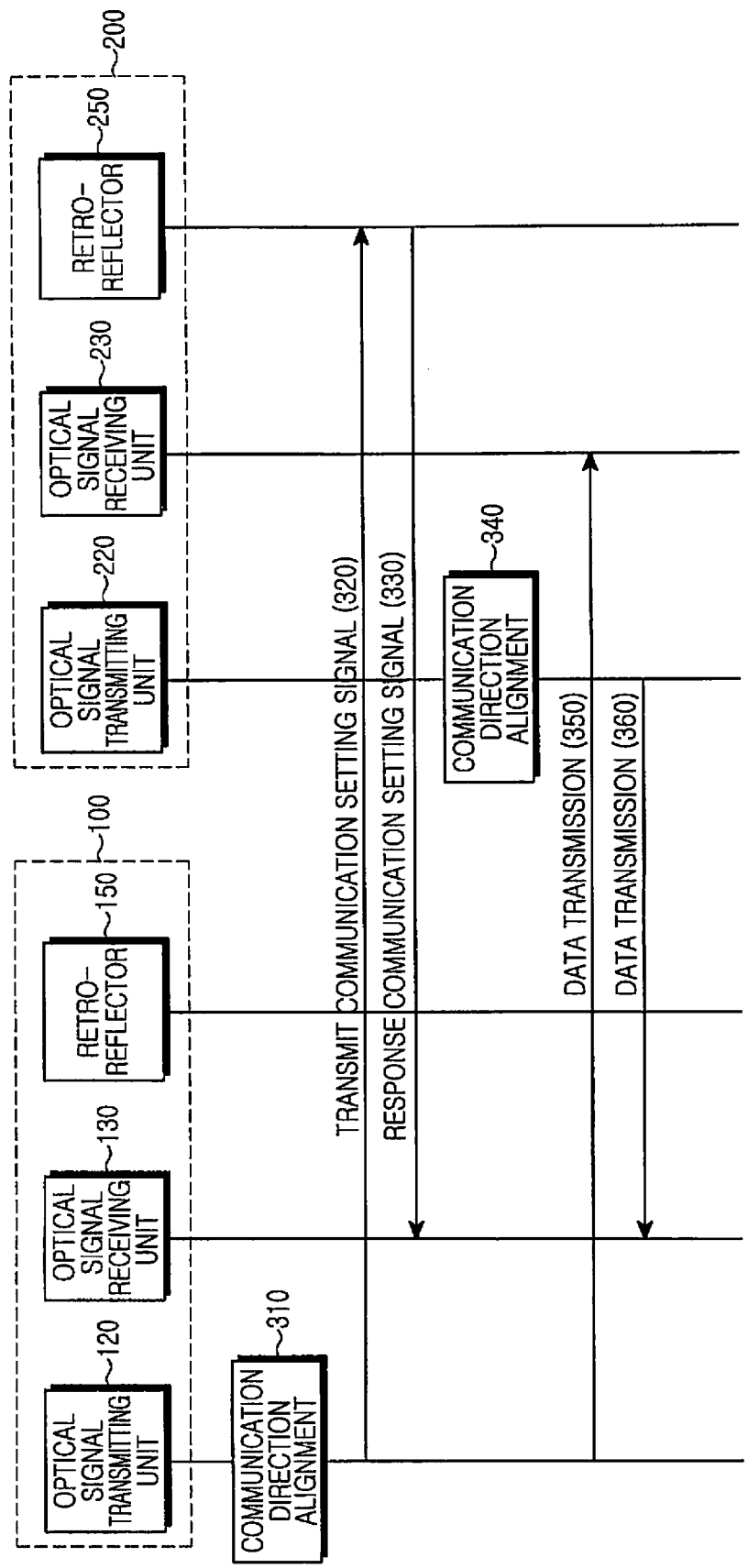
FIG. 3 is a flow diagram of a communication alignment operation using an optical communication according to an embodiment of the present invention.

FIG. 3 is a flow diagram of a communication alignment operation using an optical communication according to an embodiment of the present invention. FIG. 3 illustrates a communication alignment operation between optical communication apparatuses 100 and 200 having a retro-reflector according to an embodiment of the present invention. In FIG. 3, a first optical communication apparatus 100 includes an optical signal transmitting unit 120, an optical signal receiving unit 130, and a retro-reflector 150, and a second optical communication apparatus 200 includes an optical signal transmitting unit 220, an optical signal receiving unit 230, and a retro-reflector 250.

Referring to FIG. 3, in step 310, the optical signal transmitting unit 120 of the first optical communication apparatus 100 aligns its communication direction to be oriented toward the optical signal receiving unit 230 of the second optical communication apparatus 200. At this state, the communication direction of the second optical communication apparatus 200 is not yet oriented toward the first optical communication apparatus 100. Next, in step 320, the optical signal transmitting unit 120 of the first optical communication apparatus 100 transmits a communication setting signal to the second optical communication apparatus 200. Then, in step 330, the retro-reflector 250 of the second optical communication apparatus 200 receives the communication setting signal and reflects the communication setting signal at the same angle as the receiving angle thereof.

If the retro-reflector 250 additionally has a modulation function, a bidirectional communication link can be set through a one time communication link setting and can be implemented through one wavelength. That is to say, once the first optical communication apparatus 100 transmits an optical signal to the second optical communication apparatus 200, the second optical communication apparatus 200 retro-reflects an optical signal including data to be transmitted to the first optical communication apparatus 100 through the retro-reflector 250.

In the case of adding the modulation function to the retro-reflector 250 as described above, a mechanical scheme or an electro-optic scheme may be used. Next, in step 340, under the control of a control unit 210 (not shown) of the second optical communication apparatus 200, the communication direction of the optical signal transmitting unit 220 is set to be the same as the direction in which the retro-reflector 250 has retro-reflected and transmitted the signal. Then, in steps 350 and 360, data communication is performed between the first optical communication apparatus 100 and the second optical communication apparatus 200 whose communication direction has been bi-directionally aligned.

Figure 4A:
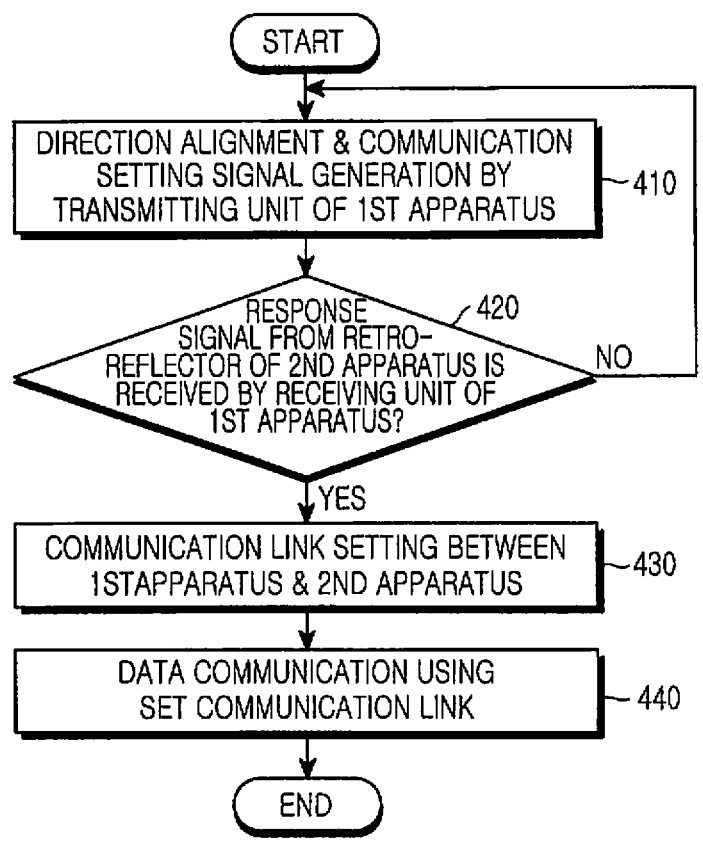
FIGS. 4A and 4B are operation flow diagrams of the optical communication apparatuses for communication using direction alignment using an optical communication according to an embodiment of the present invention.
Figure 4B:
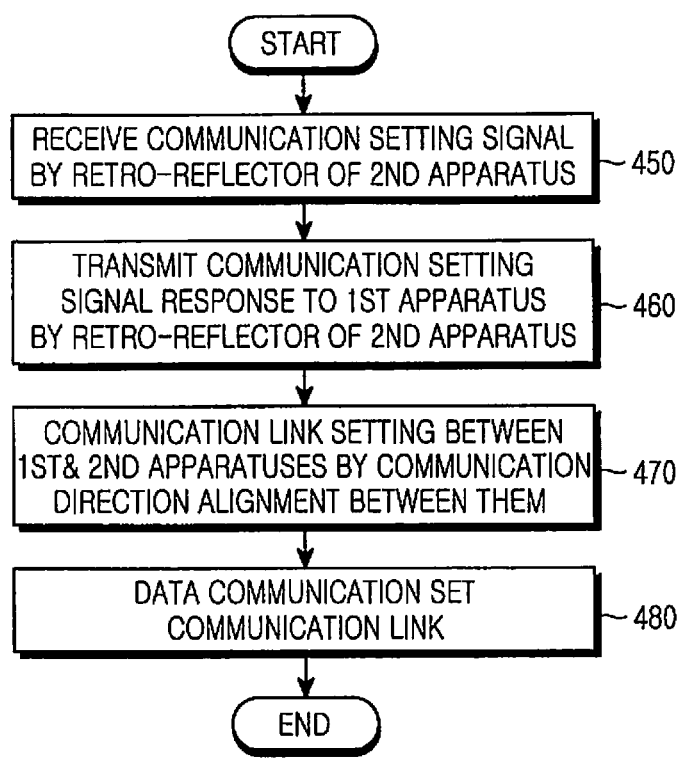

FIGS. 4A and 4B are operation flow diagrams of the optical communication apparatuses for communication direction alignment using an optical communication according to an embodiment of the present invention. FIG. 4A is an operation flow diagram of the first optical communication apparatus 100. First, in step 410, the optical signal transmitting unit 120 of the first optical communication apparatus 100 performs communication direction alignment and transmits a communication setting signal to the second optical communication apparatus 200. Next, in step 420, the first optical communication apparatus 100 determines if a response signal from the second optical communication apparatus 200 is received. At this time, if a response signal is received, the first optical communication apparatus 100 detects a reception sensitivity by using the lamp 140.

As a result of the determination in step 420, when a response signal from the second optical communication apparatus 200 is not received, the first optical communication apparatus 100 returns to step 410, in which the first optical communication apparatus 100 again performs the direction setting and transmits a communication setting signal. As a result of the determination in step 420, when a response signal from the second optical communication apparatus 200 is received, the first optical communication apparatus 100 proceeds to step 430, in which the communication link between the first optical communication apparatus 100 and the second optical communication apparatus 200 is completely set, so that the bi-directional communication alignment is completed. Then, in step 440, data transmission between the first optical communication apparatus 100 and the second optical communication apparatus 200 is performed by using the set communication link.

FIG. 4B is an operation flow diagram of the second optical communication apparatus 200. First, in step 450, the second optical communication apparatus 200 receives a communication setting signal. Next, in step 460, the retro-reflector 250 of the second optical communication apparatus 200 retro-reflects and transmits the received communication setting signal to the first optical communication apparatus 100. Next, in step 470, the second optical communication apparatus 200 sets a communication link between the first optical communication apparatus 100 and the second optical communication apparatus 200 by setting the communication direction of the optical signal transmitting unit 220 of the second optical communication apparatus 200 to be the same as the retro-reflection direction of the retro-reflector 250. In step 470, if the retro-reflector 250 additionally has a modulation function, an optical signal including data to be transmitted may be retro-reflected without the communication direction setting of the optical signal transmitting unit 220 of the second optical communication apparatus 200. Next, in step 480, data communication between the first optical communication apparatus 100 and the second optical communication apparatus 200 in the set communication direction is performed.

In the construction of the second optical communication apparatus 200 shown in FIG. 4B, the retro-reflector is always used to retro-reflect an incoming signal in order to set the communication direction. However, the second optical communication apparatus 200 may already be in a correct communication direction toward the first optical communication apparatus 100. In this case, the second optical communication apparatus 200 may operate in that data to be transmitted is transmitted through the optical signal transmitting unit at the time of initial reception of an optical signal and the retro-reflector is used to retro-reflect and transmit a response to the received optical signal only when a signal indicating reception of a signal with a reception sensitivity below a preset level from a counterpart has been received.

Figure 5A:
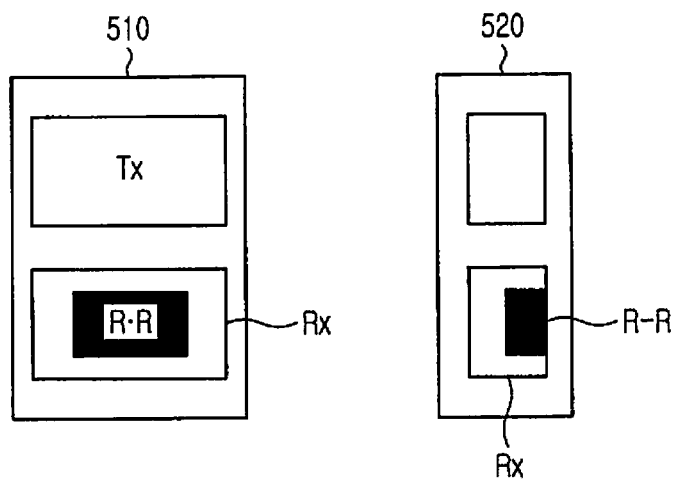
FIGS. 5A, 5B and 5C illustrate examples of constructions of optical signal receiving units provided with a retro-reflector of an optical communication apparatus according to an embodiment of the present invention.
Figure 5B:
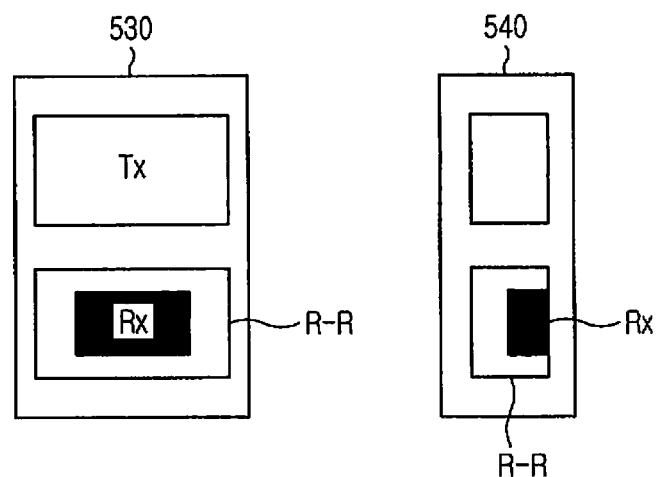
Figure 5C:
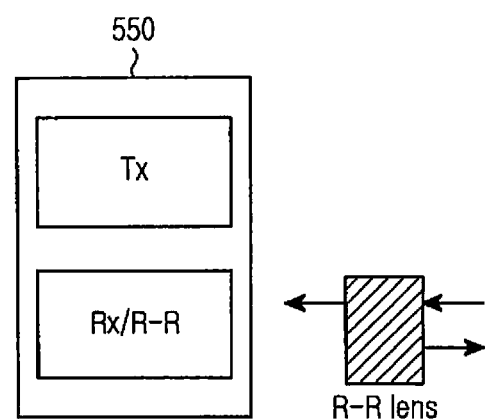

FIGS. 5A, 5B and 5C illustrate examples of constructions of optical signal receiving units provided with a retro-reflector of an optical communication apparatus according to an embodiment of the present invention.

FIG. 5A corresponds to a case where a visible ray receiving device Rx has a ring structure. Referring to FIG. 5A showing the front surface 510 and the side surface of the visible ray transmitting/receiving unit, it is noted that the visible ray transmitting/receiving unit includes a retro-reflector R-R disposed at a central portion of a visible ray receiver Rx shaped like a ring. The visible ray receiving unit may include a photo-diode. In the visible ray transmitting/receiving unit shown in FIG. 5B, the visible ray receiver Rx is located in the middle of a retro-reflector R-R, in contrast to the construction of FIG. 5A. FIG. 5C corresponds to a case where a retro-reflector R-R performs both functions of permeation and reflection.

Figure 6:
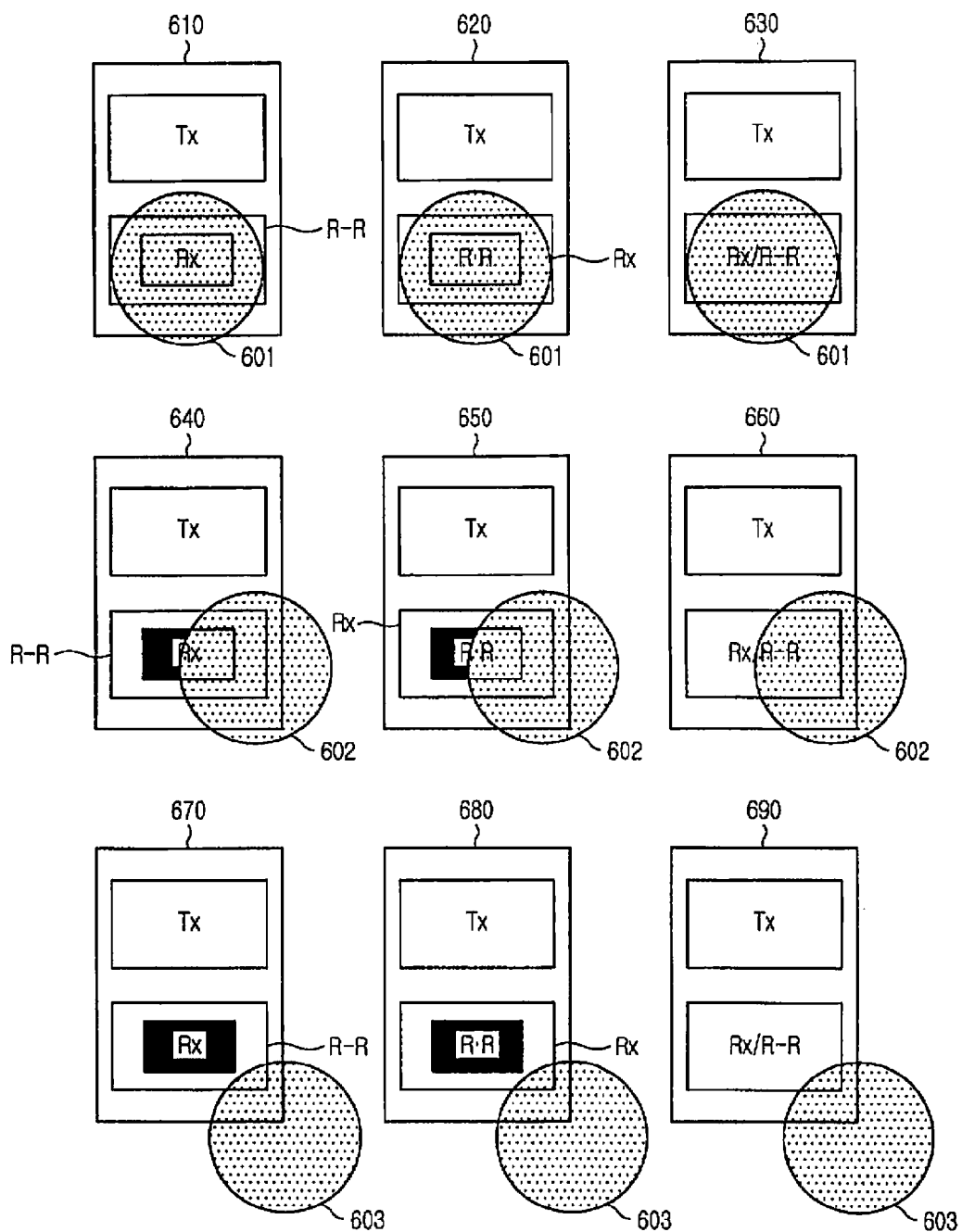
FIG. 6 illustrates examples of reception of visible rays by an optical signal receiving unit having a retro-reflector in an optical communication apparatus according to an embodiment of the present invention.

FIG. 6 illustrates examples of reception of visible rays by an optical signal receiving unit having a retro-reflector in an optical communication apparatus according to an embodiment of the present invention.

FIG. 6 shows three types of visible ray signal reception by an optical signal receiving unit of an optical communication apparatus according to an embodiment of the present invention. As shown in FIG. 6, the three types of received visible ray signals include a visible ray signal 601 received by a central portion of the optical signal receiving unit, a visible ray signal 602 received by a biased right portion of the optical signal receiving unit, and a visible ray signal 603 received by only a right lower portion of the optical signal receiving unit.

First, in the case of the visible ray signal 601 and the visible ray signal 602 received by the central portion and the biased right portion of the optical signal receiving unit, the visible ray signal can be normally received and retro-reflected both in the units 610, 620, 640, and 650 in which the visible ray receiving device and the retro-reflector are shaped like a ring and in the units 630 and 660 in which the retro-reflector has both functions of permeation and reflection. However, in the case of the visible ray signal 603 received by only a right lower portion of the optical signal receiving unit, the visible ray signal is shed on only one portion among the visible ray receiving device or the retro-reflector in the optical signal receiving units 670 and 680, so that it is impossible to properly receive or retro-reflect the visible ray signal. However, the optical signal receiving unit 630, in which the retro-reflector has both functions of permeation and reflection, can receive and retro-reflect the visible ray signal, no matter how small the quantity of the visible ray signal is.

According to an embodiment of the present invention as described above, it is possible to achieve an operation and a construction of a method and an apparatus for communication link alignment using a retro-reflector in an optical communication. According to the present invention, when a transmitter side transmits an optical signal to a receiver side in optical communication, the receiver side automatically outputs a response optical signal in the same angle as the receiving angle by using a retro-reflector and aligns its communication direction in the direction of the response optical signal output from the retro-reflector. Therefore, the receiver side can also easily align the communication direction between the transmitter side and the receiver side. Further, if the retro-reflector has a modulation function, when the receiver side receives an optical signal, the receiver side can generate a response optical signal including data to be transmitted and can directly retro-reflect the response signal to the transmitter side. Therefore, it is possible to easily establish bidirectional communication alignment even when the communication direction has been set only in a single direction.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of optical communication by a second optical communication apparatus, comprising:
   receiving a first optical signal transmitted from a first optical communication apparatus, wherein the first optical signal is for a communication setting signal;
   retro-reflecting, by a retro-reflector, a response signal including the received first optical signal to the first optical communication apparatus when the first optical communication apparatus has a reception sensitivity below a preset level;
   determining, based on a direction of the retro-reflected first optical signal, a communication direction with the first optical communication apparatus; and transmitting a second optical signal including data to be transmitted in the determined communication direction.

2. The method of claim 1, wherein the retro-reflector allows permeation of the first optical signal and reflects the first optical signal.

3. A transmitting optical communication apparatus, comprising: an optical signal transceiver configured to transmit a first optical signal and receive, when the transmitting optical communication apparatus has a reception sensitivity below a preset level, a response signal retro-reflected by a retro-reflector of a receiving optical communication apparatus that received the first optical signal
   a controller configured to determine, based on a direction of the retro-reflected first optical signal, a communication direction with the receiving optical communication apparatus and transmitting a second optical signal in the determined communication direction.

4. The transmitting optical communication apparatus of claim 3, further comprising at least one of a lamp and a reception sensitivity measurer, which indicates the reception sensitivity of the first optical signal received by the optical signal transceiver.

5. The first optical communication apparatus of claim 3, wherein the optical signal receiving unit includes:
   an input unit for user input;
   a data storage unit to store received data; and
   a display unit to display information.

6. The first optical communication apparatus of claim 3, wherein the optical signal receiving unit is a portable mobile apparatus.

7. A method of optical communication by a first optical communication apparatus, comprising:
   transmitting a first optical signal to a second optical communication apparatus;
   receiving, when the transmitting optical communication apparatus has a reception sensitivity below a preset level, a response signal including the first optical signal, the response signal is retro-reflected by a retro-reflector of the second optical communication apparatus;
   determining a communication direction with the second optical communication apparatus; and
   transmitting a second optical signal in the determined communication direction.

8. The method of claim 7, wherein the retro-reflector allows permeation of the first optical signal and reflects the second optical signal.

9. A receiving optical communication apparatus, comprising:
   an optical signal transceiver configured to receive a first optical signal transmitted from a transmitting optical communication apparatus;
   a retro-reflector configured to retro-reflect a response signal including the received first optical signal to the first optical communication apparatus when the first optical communication apparatus has a reception sensitivity below a preset level; and
   a controller configured to:
   determine, based a direction of the retro-reflected first optical signal, a communication direction with the transmitting optical communication apparatus, and
   transmit a second optical signal in the determined communication direction.

10. The receiving optical communication apparatus of claim 9, wherein the retro-reflector which allows permeation of the first optical signal and reflects the first optical signal.

11. The first optical communication apparatus of claim 9, wherein the retro-reflector has a mechanical modulation function or an electro-optic modulation function.

* * * * *